No. 785,486. PATENTED MAR. 21, 1905.
R. P. GIBBS.
NIGHT LAMP.
APPLICATION FILED SEPT. 20, 1902.
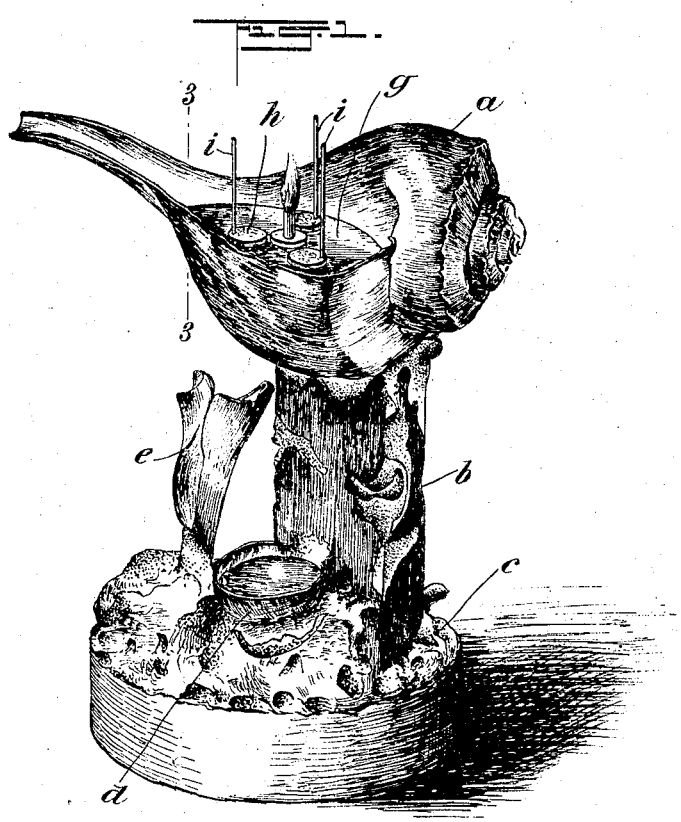
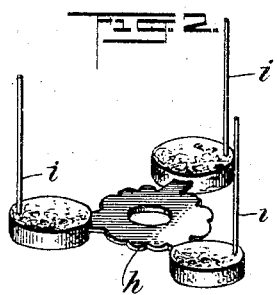
WITNESSES:
INVENTOR
Robert P. Gibbs
BY
ATTORNEYS.

No. 785,486. Patented March 21, 1905.

UNITED STATES PATENT OFFICE.

ROBERT P. GIBBS, OF NEW YORK, N. Y.

NIGHT-LAMP.

SPECIFICATION forming part of Letters Patent No. 785,486, dated March 21, 1905.

Application filed September 20, 1902. Serial No. 124,167.

*To all whom it may concern:*

Be it known that I, ROBERT P. GIBBS, a citizen of the United States, and a resident of the city of New York, borough of Manhattan, in the county and State of New York, have invented a new and Improved Night-Lamp, of which the following is a full, clear, and exact description.

This invention relates particularly to a night-lamp of that class which is adapted to contain oil which is burned through the medium of a wick floated on the surface of the oil.

The prime feature of the invention lies in the adaptation to such a lamp of the shell of a fish or other shell-bearing animal, such shell being made to contain the oil, so that the light is shed through the shell with the various colors thereof. This gives a very beautiful effect.

This specification is an exact description of one example of my invention, while the claim defines the actual scope thereof.

Reference is to be had to the accompanying drawings, forming a part of this specification, in which similar characters of reference indicate corresponding parts in all the views.

Figure 1 is a view showing the lamp in use. Fig. 2 is a view illustrating the wick-floater with certain of my improvements applied; and Fig. 3 is a detail section on the line 3 3 in Fig. 1, illustrating the manner of treating the shell.

In Fig. 1, $a$ indicates the shell of the shell-fish commonly known as "conch," which is particularly well adapted to my invention. I desire it distinctly understood, however, that various other shells may be employed with equally or nearly equally good results. According to the arrangement here shown the shell $a$ is mounted on a pedestal $b$, which rises from a base $c$. Fig. 1 shows a device adapted for use in private devotions, and the base $c$ is therefore fitted with a cup $d$ for containing holy water and a fragment of shell $e$, adapted to hold incense. The cup $d$ is preferably formed of a shell, so that the idea of the marine effect is fully carried out. I also prefer to form the base $c$ and pedestal $b$ in a manner representing the sea or its growths. This, however, is not essential.

I have discovered that marine shells contain pigments giving a great number of differently-blended colors, so that a light may be passed through a shell carrying the colors thereof. Ordinarily, however, the shells are too thick and are coated with growths which render them naturally unfit for use in my invention. To overcome this difficulty, however, I first treat the shells with muriatic or some other acid substance capable of partly disintegrating the shells, which enables me to cut away the shells to any desired degree and make them sufficiently thin and transparent for the purposes of my invention. Also when certain effects are desired I form on the shell a layer or coating of glass. This layer of glass may be either inside or outside, or both inside and outside of the shell. In Fig. 3 a layer of glass (indicated at $f$) is shown, this layer of glass passing around the outside of the shell. The glass may be colored, if desired, or it may be merely transparent. In case the glass is colored it lends to the natural color of the shell. In case the glass is not colored it strengthens the shell and enables me to allow the acid to reduce the shell to the thinnest possible extent, so that the shell would ordinarily become too fragile for practical use; but in case the glass is first applied it forms a stout body, retaining the natural form of the shell and preventing the destruction of the part of the shell which is left in the glass.

In the use of the invention the shell is filled with a suitable oil (which is indicated at $g$ in Fig. 1) and the usual wick-floating device $h$ is placed on the surface of the oil. The wick being ignited, the lamp will burn and the various colors of the shell will appear in the light, thus giving a particularly beautiful effect. In order to prevent the floater from coming in contact with the shell and the flame of the wick from destroying the shell, I attach to the floater a number of upright pins $i$. (Best illustrated in Fig. 2.) As the level of the oil in the shell is lowered and as the floater swerves toward the side of the shell, thus endangering the same, these pins will strike the shell and prevent the wick from approaching nearer. The shell may be coated inside with any suitable substance to render it impervious to the oil, so that leakage will be prevented. This substance is preferably such as is not affected by the heat of the flame.

Having thus described my invention, I claim as new and desire to secure by Letters Patent—

A night-lamp, comprising an animal-shell, means whereon the shell is mounted to stand with its open side upward, whereby said shell may serve as a font for the oil, a wick-floater located in the shell, for the purpose specified, said wick-floater comprising a buoyant body, and a plurality of upright pins carried thereby and arranged to strike the side of the shell to prevent the flame from the wick striking the shell.

In testimony whereof I have signed my name to this specification in the presence of two subscribing witnesses.

ROBERT P. GIBBS.

Witnesses:
 ISAAC B. OWENS,
 JNO. M. RITTER.